UNITED STATES PATENT OFFICE.

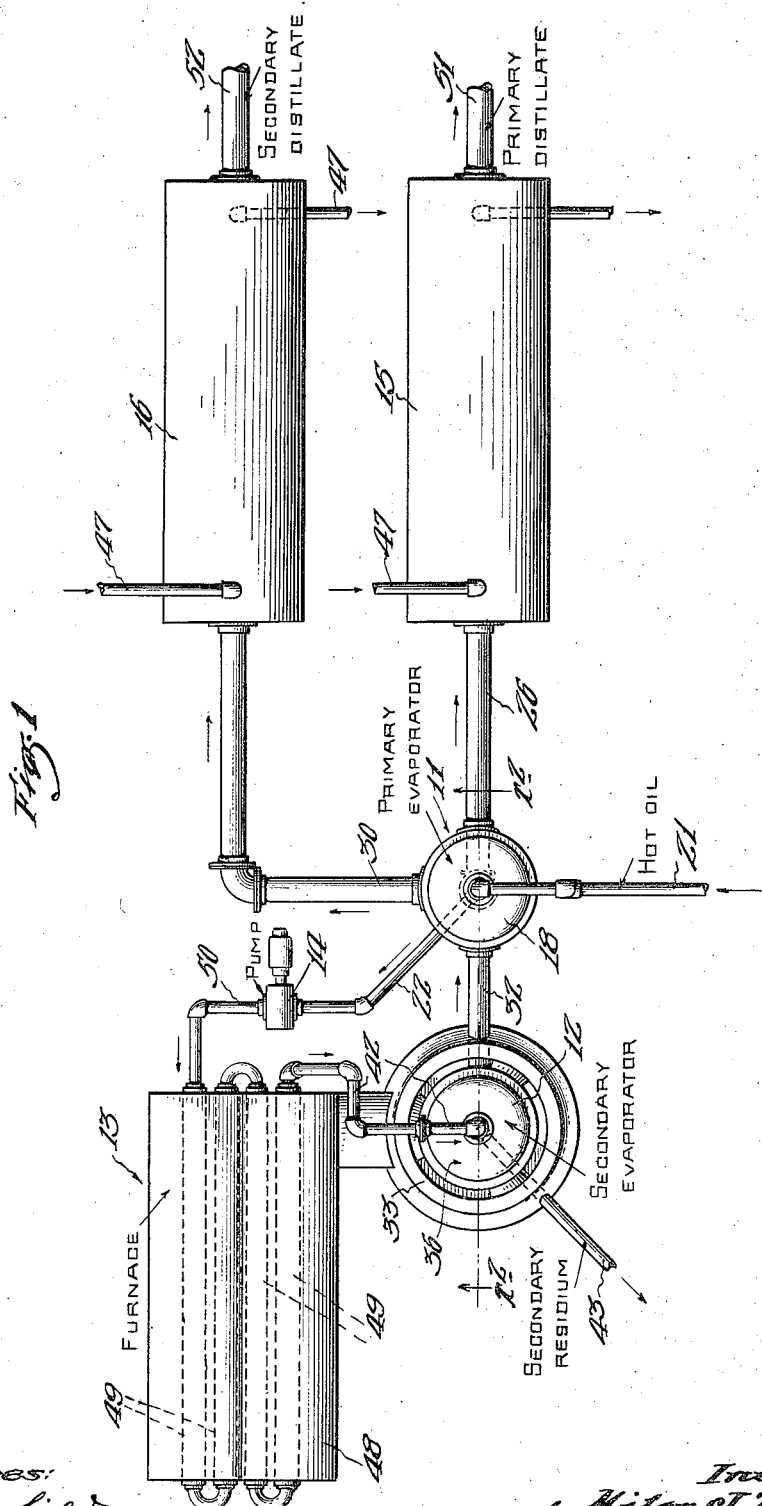

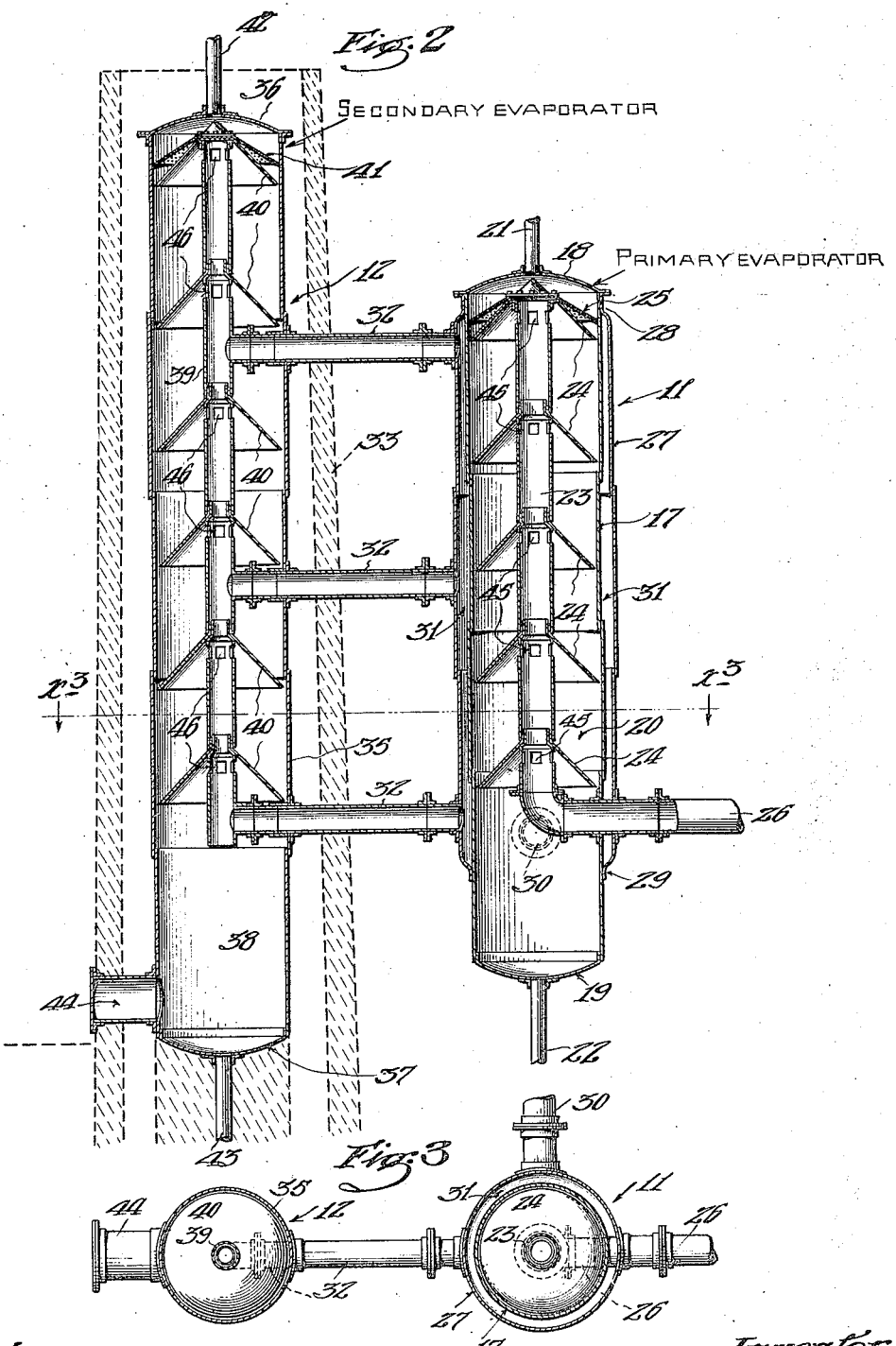

MILON J. TRUMBLE, OF LOS ANGELES, CALIFORNIA, ASSIGNOR, BY MESNE ASSIGNMENTS, TO SIMPLEX REFINING COMPANY, A CORPORATION OF CALIFORNIA.

DOUBLE EVAPORATOR AND PROCESS OF TREATING PETROLEUM-OILS.

1,250,052. Specification of Letters Patent. Patented Dec. 11, 1917.

Application filed December 5, 1914. Serial No. 875,737.

*To all whom it may concern:*

Be it known that I, MILON J. TRUMBLE, a citizen of the United States, residing at Los Angeles, in the county of Los Angeles, State of California, have invented a new and useful Double Evaporator and Processes of Treating Petroleum-Oils, of which the following is a specification.

My invention relates to the art of refining oils, and particularly to the art of refining crude petroleum.

In Letters Patent No. 996,736, for evaporator for petroleum oils and other liquids, granted to me on July 4, 1911, I have disclosed an apparatus for evaporating oils which is commonly called an evaporator. In the following specification I disclose a process by which I produce new and useful results, and in which I utilize such an evaporator in connection with other structures which will hereinafter be more fully described.

In the refining of petroleum oils, and particularly in the refining of asphalt base oils to produce asphalt, and the like, it is often necessary to subject the oils to extremely high temperatures. These high temperatures are injurious to the lighter contents of the oil and it is highly desirable to remove the vapors having a moderate boiling point before subjecting the oils to high temperatures. The principal object of the invention is to provide means for so removing a certain proportion of the oil by moderate heating before subjecting it to higher heats.

The secondary vapors given off by the higher temperature or secondary distillation must be condensed, and a further object of my invention is to use the latent heat of these secondary vapors in whole or in part for my primary distillation, thereby simplifying not only the problem of condensing the secondary vapors, but also the problem of supplying the heat necessary for the primary distillation.

In my invention I use a primary and a secondary evaporating means. The oil at any desired temperature is passed into the primary evaporator which is maintained at a moderate temperature by means to be explained, and certain primary vapors are taken therefrom. The primary residuum from the primary evaporator is then further heated and passed into the secondary evaporator, which is preferably externally heated. The secondary vapors, due to the distillation taking place in the secondary evaporator, are then utilized to heat the primary evaporator preferably by means which will be described.

Further objects and advantages will be made evident hereinafter, or will be evident to one skilled in the arts to which the invention pertains, after reading the annexed specification and inspecting the annexed drawings.

The drawings and specifications illustrate and describe one embodiment of my invention and the doctrine of equivalents should be broadly applied in construing the claims.

In the drawings,

Figure 1 is a plan view, largely diagrammatic, of a portion of the apparatus used in my process.

Fig. 2 is a partial elevation on the line $x^2$—$x^2$ of Fig. 1, certain of the parts being shown in section to better illustrate the invention.

Fig. 3 is a sectional plan view of the apparatus taken on the plane $x^3$—$x^3$ of Fig. 2.

The apparatus broadly considered, consists of a primary evaporator 11, a secondary evaporator 12, a furnace 13, an oil pump 14, a primary condenser 15, and a secondary condenser 16. The furnace 13, the oil pump 14 Fig. 1, and the condensers 15 and 16 may have any convenient form, the form shown being merely illustrative.

The primary evaporator 11 and the secondary evaporator 12 may be formed as shown in Fig. 2. The primary evaporator consists of a wall 17 which may be formed of sections, as shown, or which may be in the form of a continuous plate. A top 18 and a bottom 19 form with the wall 17 a primary evaporating chamber 20. Hot oil is conducted into the top of this chamber by means of a hot oil pipe 21, and the primary residuum is conducted from this chamber by means of a primary residuum pipe 22. A vapor column 23 is centrally located in the primary evaporating chamber 20 extending upwardly therethrough and being provided with a series of deflecting cones 24 and a perforated distributing cone 25. A primary vapor outlet 26 is in open communication with the vapor column 23 and extends through the side wall 17 of the evaporator. The wall 17 is surrounded by a shell 27 which is tightly secured to the wall 17 at the points 28 and 29, the primary vapor outlet 26 passing through the shell 27 and being tightly secured therein. A vapor and liquid outlet 30 is provided for conducting the condensed liquid and vapor from the interior of the heating compartment 31 formed between the shell 27 and the wall 17. Vapor take-offs 32 connect with the interior of the heating compartment 31. The evaporator 12 consists of an outer wall 35 having a top 36 and a bottom 37, the parts 35, 36, and 37 forming a secondary evaporating chamber 38. Located in the chamber is a secondary vapor column 39 which has secured thereon secondary deflecting cones 40 and a secondary perforated distributing cone 41. Heated residuum is admitted through the top 36 by means of the heated primary residuum pipe 42, and secondary residuum is removed from the bottom 37 by means of a secondary residuum pipe 43. A man hole is provided at 44 to give access to the bottom of the secondary evaporating chamber 38. The vapor column 23 is perforated at 45 to allow the vapors from the primary evaporating chamber 20 to pass freely into the primary vapor column 23, and the secondary vapor column 39 is similarly perforated at 46 to allow the vapors from the secondary evaporating chamber 38 to pass freely into the secondary vapor column 39. The vapor take-offs 32 are in open communication with the interior of the secondary vapor column 39 connecting it with the heating compartment 31 of the primary. The condensers 15 and 16 are provided with water pipes 47 by which they may be cooled. The furnace 13 consists preferably of an outer shell 48 in which any suitable heating means is installed and in which there are a series of retorts 49 which are fed with primary residuum through the pipe 50 by the pump 14, the heated primary residuum passing from the retorts 49 through the pipe 42 into the top of the secondary evaporating chamber 38.

The method of operation of the invention is as follows:

Oil which may have been heated by absorption from the outflowing secondary residuum or vapors, or in a furnace, not shown, but similar in construction to the furnace 13, is passed through the hot oil pipe 21 into the top of the primary evaporating chamber 20, falling upon the distributing cone 28 and passing through the holes therein onto the first of the deflecting cones 24, being thrown from the edge of this cone onto the interior surface of the wall 17, and passing downwardly thereover in a thin stream, any oil which leaves this wall being returned thereto by the lower deflecting cones 24. The oil passing in a thin stream or film absorbs heat from the secondary vapors in the heating compartment 31, the primary vapors being released from this thin film and filling the interior of the primary evaporating chamber 20. These vapors pass through the openings 45 into the interior of the primary vapor column 23 and outwardly through the primary vapor column 26 into the primary condenser 15 where they are condensed, passing out as a primary distillate through a primary distillate pipe 51. The residuum from the primary evaporation taking place in the primary evaporating chamber 20 passes outwardly through the primary residuum pipe 22 to the pump 14, this pump forcing the primary residuum through the pipe 50 into the retorts 49 which are heated by the furnace 48, the heated primary residuum passing upwardly through the pipe 42 and into the secondary evaporating chamber 38. The heated primary residuum from the pipe 42 falls upon the secondary distributing cone 41, passing through the perforations therein onto the first of the secondary deflecting cones 40 and being forced from the edge of the first of the deflecting cones 40 onto the inner surface of the wall 35, passing downwardly over this inner surface in a thin film, any oil which is deflected therefrom being returned to the inner surface of the wall 35 by the lower secondary deflecting cones 40. The heated gases from the furnace 13 passing upwardly through the stack 33 heat the wall 35 and cause an evaporation to take place from the thin film of oil passing downwardly over the inner surface thereof. The secondary vapors released from this thin film fill the secondary evaporating chamber 38 and pass through the openings 46 into the interior of the secondary vapor column 39. These vapors pass outwardly through a wall 35 and through a stack 33, through the secondary vapor take-offs 32 into the heating compartment 31, and thence through the vapor and liquid pipe 30 into the condenser 16 where they are cooled into a secondary distillate which may be taken off through a secondary distillate pipe 52. It will be noted that the secondary vapors are lowered in temperature in passing through the heating compartment 31, giving up their latent heat of evaporation to the wall 17, which in turn gives up the heat units to the thin film of oil flowing over the inner surface thereof, the heat units being absorbed by the primary vapors as latent heat of evaporation. This arrangement produces a very great fuel economy.

By first raising the oil to be treated to a moderate heat in the primary evaporator, and taking off the lighter vapors before attempting to raise the oil to its final temperature in the furnace 13, all danger of cracking or changing the molecular structure of the lighter vapors, which make up the primary distillate, is avoided, and these vapors are taken off in their natural condition. The amount of heat applied to the oil entering through the pipe 21 depends on the kind of oil that is being refined, and in the case of some light oils such primary heating may be dispensed with, the oil entering through the pipe 21 being in its natural state. The various temperatures may be so controlled that the secondary residuum is an asphalt, or this secondary residuum may be still further treated to produce an asphalt.

I claim as my invention:

1. In an oil refining apparatus, a primary evaporator, means for taking off primary vapors from said primary evaporator, means for taking off and heating the primary residuum from said primary evaporator, a secondary evaporator, means for passing said primary residuum into said secondary evaporator, means for taking off secondary residuum from said secondary evaporator, means for taking off secondary vapors from said secondary evaporator, and means for utilizing said secondary vapors as a heating means in said primary evaporator.

2. In an oil refining apparatus, a primary evaporator, means for taking off primary vapors from said primary evaporator, means for taking off and heating the primary residuum from said primary evaporator, a secondary evaporator, means for passing said primary residuum into said secondary evaporator, means for taking off secondary residuum from said secondary evaporator, means for taking off secondary vapors from said secondary evaporator, walls forming a heating compartment in said primary evaporator, and means for passing said secondary vapors into said heating compartment.

3. The process of refining oils which consists in raising an oil to a moderate temperature, releasing the primary vapors therefrom, raising the residuum to a higher temperature, releasing secondary vapors therefrom, and utilizing the latent heat of evaporation in said secondary vapors to supply latent heat of evaporation to said primary vapors.

4. In an oil refining apparatus, a furnace, a stack through which the products of combustion from said furnace are passed, a primary evaporator, means for taking off primary vapors from said primary evaporator, means for taking off and heating the primary residuum from said primary evaporator, a secondary evaporator located in said stack, means for passing said primary residuum into said secondary evaporator, means for taking off secondary residuum from said secondary evaporator, means for taking off secondary vapors from said secondary evaporator, and means for utilizing said secondary vapors as a heating means in said primary evaporator.

5. In an oil refining apparatus, a furnace, a stack through which the products of combustion from said furnace are passed, a primary evaporator, means for taking off primary vapors from said primary evaporator, means for taking off and heating the primary residuum from said primary evaporator, a secondary evaporator located in said stack, means for passing said primary residuum into said secondary evaporator, means for taking off secondary residuum from said secondary evaporator, means for taking off secondary vapors from said secondary evaporator, walls forming a heating compartment in said primary evaporator, and means for passing said secondary vapors into said heating compartment.

In testimony whereof, I have hereunto set my hand at Los Angeles, California, this 28th day of November, 1914.

MILON J. TRUMBLE.

In presence of—
A. J. GUTZLER,
FRED A. MANSFIELD.